(12) United States Patent
Ballard

(10) Patent No.: US 10,572,016 B2
(45) Date of Patent: Feb. 25, 2020

(54) SPATIALIZED HAPTIC DEVICE FORCE FEEDBACK

(71) Applicant: Microsoft Technology Licensing, LLC, Redmond, WA (US)

(72) Inventor: Jeffrey Ryan Ballard, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 73 days.

(21) Appl. No.: 15/913,723

(22) Filed: Mar. 6, 2018

(65) Prior Publication Data

US 2019/0278369 A1      Sep. 12, 2019

(51) Int. Cl.
| | |
|---|---|
| G06F 3/01 | (2006.01) |
| A63F 13/28 | (2014.01) |
| A63F 13/23 | (2014.01) |
| A63F 13/285 | (2014.01) |
| A63F 13/323 | (2014.01) |
| A63F 13/54 | (2014.01) |

(52) U.S. Cl.
CPC .............. *G06F 3/016* (2013.01); *A63F 13/23* (2014.09); *A63F 13/28* (2014.09); *A63F 13/285* (2014.09); *G06F 3/011* (2013.01); *A63F 13/323* (2014.09); *A63F 13/54* (2014.09)

(58) Field of Classification Search
CPC combination set(s) only.
See application file for complete search history.

(56) References Cited

U.S. PATENT DOCUMENTS

| | | | |
|---|---|---|---|
| 5,405,152 A | 4/1995 | Katanics et al. | |
| 7,159,008 B1 | 1/2007 | Wies et al. | |
| 8,686,941 B2 | 4/2014 | Rank | |
| 9,030,411 B2 * | 5/2015 | Itkowitz | G06F 3/016 345/156 |

(Continued)

OTHER PUBLICATIONS

"iMotion—Haptic feedback virtual reality motion control", Retrieved from: <<https://web.archive.org/web/20130928033509/https:/www.kickstarter.com/projects/576456616/imotion-3d-motion-controller-with-haptic-feedback>>, Sep. 28, 2013, 20 Pages.

(Continued)

*Primary Examiner* — Van N Chow
(74) *Attorney, Agent, or Firm* — Alleman Hall Creasman & Tuttle LLP

(57) ABSTRACT

A method for controlling spatialized force feedback on one or more haptic devices includes establishing, via a communication interface, communication with the one or more haptic devices, instantiating one or more virtual haptic sources, each virtual haptic source having a virtual position in a virtual environment and configured to emit a haptic signal characterized by a set of haptic parameters, and for each of the one or more haptic devices, instantiating a virtual haptic receiver having a virtual position in the virtual environment and translation logic. The virtual haptic receiver may be configured to receive, from each of one or more virtual haptic sources, the haptic signal for the virtual haptic source, translate the received haptic signal into a haptic device instruction based on the translation logic, and send, via the communication interface, the haptic device instruction to the haptic device.

19 Claims, 6 Drawing Sheets

(56) References Cited

U.S. PATENT DOCUMENTS

| | | |
|---|---|---|
| 9,083,821 B2 | 7/2015 | Hughes |
| 9,274,603 B2 | 3/2016 | Modarres et al. |
| 9,348,416 B2 | 5/2016 | Weddle et al. |
| 9,449,476 B2 | 9/2016 | Lynn et al. |
| 9,607,527 B2 | 3/2017 | Hughes |
| 9,619,980 B2 | 4/2017 | Cruz-Hernandez et al. |
| 9,715,276 B2 | 7/2017 | Da Costa et al. |
| 9,741,215 B2 | 8/2017 | Brav et al. |
| 9,916,003 B1 * | 3/2018 | Sinclair .................. G06F 3/011 |
| 2005/0017454 A1 | 1/2005 | Endo et al. |
| 2010/0234094 A1 | 9/2010 | Gagner et al. |
| 2014/0004956 A1 | 1/2014 | Miura et al. |
| 2014/0085414 A1 | 3/2014 | Zhou et al. |
| 2014/0232657 A1 | 8/2014 | Aviles et al. |
| 2014/0267911 A1 | 9/2014 | Grant et al. |
| 2015/0355711 A1 | 12/2015 | Rihn |
| 2016/0171846 A1 | 6/2016 | Brav et al. |
| 2016/0175701 A1 | 6/2016 | Froy et al. |
| 2016/0274662 A1 * | 9/2016 | Rimon .................. G06F 3/014 |
| 2016/0320843 A1 | 11/2016 | Long et al. |
| 2016/0349913 A1 | 12/2016 | Lynn et al. |
| 2017/0003139 A1 | 1/2017 | Taylor et al. |
| 2017/0010671 A1 * | 1/2017 | Ghaffari Toiserkan ...................... G06F 3/016 |
| 2017/0123499 A1 | 5/2017 | Eid |

OTHER PUBLICATIONS

Forsslund, Jonas, "Preparing Spatial Haptics for Interaction Design", In PhD Thesis of KTH Royal Institute of Technology, Mar. 2, 2016, 95 Pages.

Kushimi, et al., "AtmoSphere: Designing Cross-Modal Music Experiences Using Spatial Audio with Haptic Feedback", In Proceedings of Special Interest Group on Computer Graphics and Interactive Techniques Conference, Jul. 30, 2017, 2 Pages.

"International Search Report and Written Opinion Issued in PCT Application No. PCT/US19/019059", dated May 8, 2019, 11 Pages.

\* cited by examiner

SPATIALIZED HAPTIC DEVICE FORCE FEEDBACK

BACKGROUND

Haptic devices may be used to enhance interaction with a virtual environment, such as a video game or virtual reality experience. In particular, haptic devices may be used to provide force feedback that represents virtual forces in the virtual environment. Such force feedback may enhance a perception of tangibility of the virtual environment that may make the virtual experience more immersive and realistic.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for controlling spatialized force feedback on one or more haptic devices includes establishing, via a communication interface, communication with the one or more haptic devices, instantiating one or more virtual haptic sources, each virtual haptic source having a virtual position in a virtual environment and configured to emit a haptic signal characterized by a set of haptic parameters, and for each of the one or more haptic devices, instantiating a virtual haptic receiver having a virtual position in the virtual environment and translation logic. The virtual haptic receiver may be configured to receive, from each of one or more virtual haptic sources, the haptic signal for the virtual haptic source, translate the received haptic signal into a haptic device instruction based on the translation logic, and send, via the communication interface, the haptic device instruction to the haptic device.

DETAILED DESCRIPTION

Figure 1:
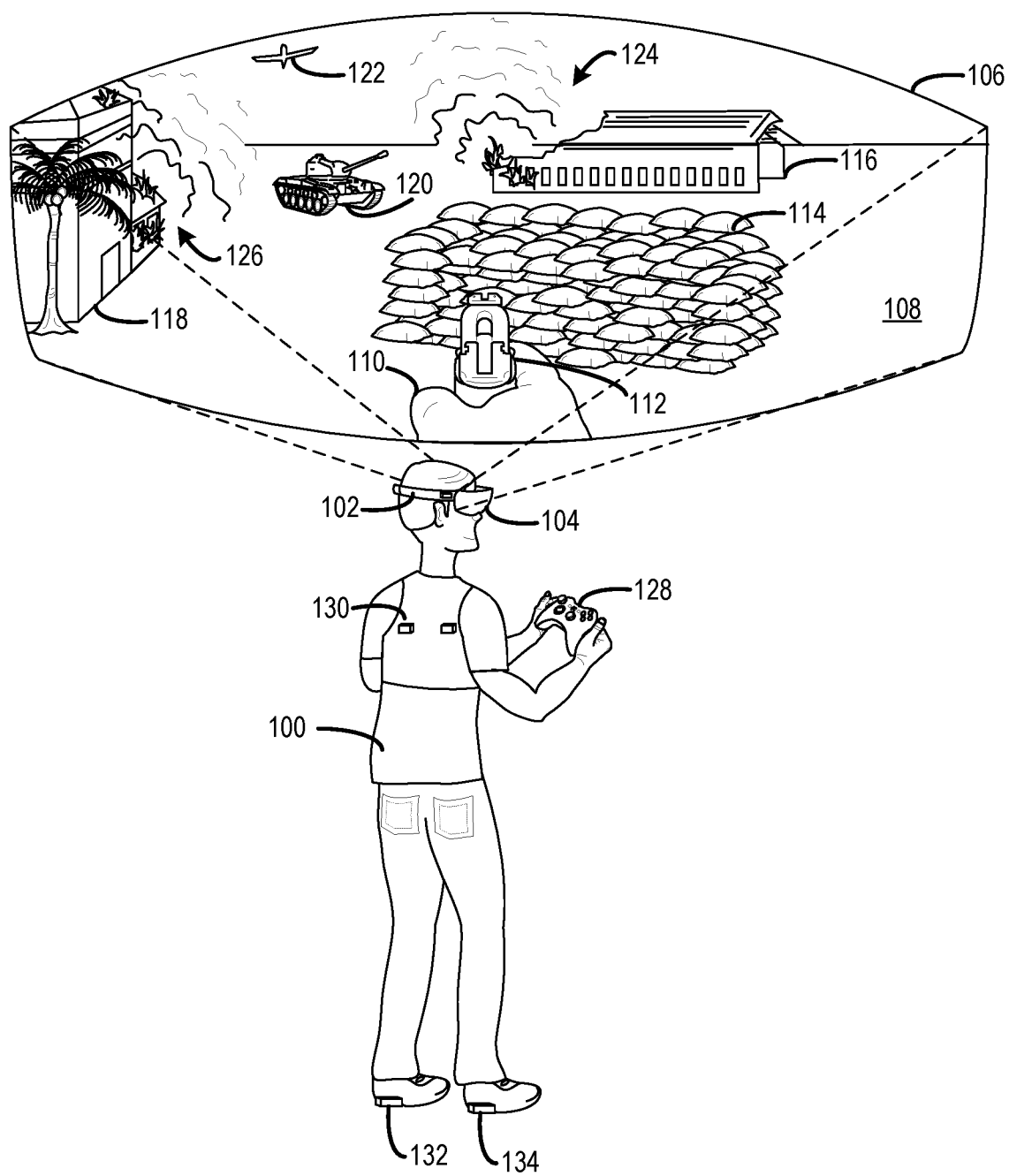
FIG. 1 shows an example scenario in which a user interacts with a virtual environment using a plurality of haptic devices configured to provide spatialized force feedback.

As computer software and hardware have become more powerful and advanced, virtual environments, such as video game environments, have become richer and more realistic. Graphics, movement of characters and avatars, and the interaction of various visual elements have all become increasingly realistic. Furthermore, haptic devices (e.g., rumble, vibration, shock) have become more complex and ubiquitous in use with video games and other virtual experiences. Despite the advances in aspects of virtual environments and haptic devices, providing realistic spatialized haptic feedback via software remains extremely difficult and computationally complex. Conventional approaches for simulating virtual forces via haptic feedback typically require developers to hard code specific haptic events for specific haptic devices, which is very labor intensive and does not allow for adapting to changes in a virtual environment and/or different types of haptic devices to be used to interact with the virtual environment.

Accordingly, the present description is directed to an approach for controlling haptic devices to provide spatialized force feedback from virtual haptic sources within in a virtual environment. Such an approach may be performed by characterizing a virtual environment in terms of haptic sources that are capable of emitting haptic signals and haptic receivers that are capable of receiving haptic signals from the virtual haptic sources. For example, one or more virtual haptic sources may be instantiated. Each virtual haptic source may have a virtual position in a virtual environment and may be configured to emit a haptic signal characterized by a set of haptic parameters. Further, for each of one or more haptic devices being used to enhance interaction with the virtual environment, a virtual haptic receiver may be instantiated. Each virtual haptic receive may have a virtual position in the virtual environment and translation logic. Each haptic receiver may be configured to receive, from each of one or more virtual haptic sources, the haptic signal for the virtual haptic source, translate the received haptic signal into a haptic device instruction based on the translation logic, and send, via a communication interface, the haptic device instruction to the haptic device. Each haptic device instruction may be in a format that is compatible with the haptic device, such that the haptic device may provide force feedback based on the received haptic device instruction.

According to the spatialized nature of the virtual haptic sources and virtual haptic receivers, different haptic devices may provide different force feedback based on at least the virtual position of the virtual haptic source, the virtual position of the virtual haptic receiver, and/or the set of haptic parameters that define the haptic signal. For example, a haptic signal may be adjusted differently for different virtual haptic receivers to account for a distance that the haptic signal travels, interaction with intermediate virtual objects, and/or traveling along indirect paths, among other spatial considerations. Such adjustments may allow for a realistic spatialized simulation of virtual forces.

Unlike conventional attempts to simulate virtual forces by hard coding specific haptic events for specific haptic devices, the described approach spatially characterizes virtual forces in a virtual environment in order to control force feedback in a manner that is adaptable to different virtual environments and extensible to different types of haptic devices. In particular, each haptic device is controlled by a separate virtual haptic receiver that is configured to translate received haptic signals into haptic device instructions that are compatible with the particular type of haptic device. Further, because each virtual haptic receiver is programmed to receive and translate generic haptic signals, regardless of the virtual haptic source, every haptic device for which a virtual haptic receiver has been programmed is automatically compatible with every possible type of haptic source. Such an approach, eliminates the need to custom script each haptic effect for every specific type of haptic device.

FIG. 1 shows a user 100 wearing a head-mounted display (HMD) type virtual-reality computing system 102. The computing system 102 includes a near-eye display 104. The near-eye display 104 is configured to visually present a field of view (FOV) 106 of a virtual environment 108 to the user 100. The virtual environment 108 may simulate a real world and/or an imagined world, allowing the user 100 to interact with that virtualized world.

The computing system 102 may be configured to present the virtual environment 108 via the near-eye display 104 based on the execution of instructions in the form of video game code or another software application. The video game code or software application may define parameters of the virtual environment 108 including a virtual world and corresponding virtual coordinate system, game rules and underlying mathematical patterns (e.g., physics engine), virtual objects, virtual environment, virtual characters, audio design/sound effects, and haptic design/haptic effects.

In the depicted example, the field of view 106 of the near-eye display 104 visually presents a first-person perspective of the virtual environment 108. This perspective of the virtual environment 108 depicts a first-person view of a virtual avatar 110 holding a virtual gun 112 during a battle. The virtual avatar 110 is positioned in the virtual environment 108 behind a virtual sandbag bunker 114. A virtual hangar 116 is positioned beyond the virtual sandbag bunker 114. A virtual building 118 is positioned on the left side of the field of view 106 beyond the virtual sandbag bunker 114. A virtual tank 120 is positioned in between the virtual hangar 116 and the virtual building 118 and is approaching the virtual avatar 110. Furthermore, a virtual airplane 122 has dropped virtual bombs on the virtual hangar 116 and the virtual building 118 that create virtual explosions 124 and 126. The virtual airplane 122 is positioned in the sky beyond the virtual tank 120 and flying away from the virtual avatar 110.

Note that the depicted perspective is meant to be non-limiting, and any suitable perspective of any suitable virtual environment may be visually presented in the field of view 106 of the near-eye display 104. In another example, the field of view may visually present a third-person view of the virtual avatar 110 in the virtual environment 108. While FIG. 1 depicts a scenario where the user 100 views the virtual world via a near-eye display 104, the present disclosure is compatible with virtually any type of display, including virtual-reality displays, augmented-reality displays, mixed-reality displays, television displays, desktop displays, laptop displays, tablet displays, mobile phone displays, and hand-held game displays.

In FIG. 1, the user 100 provides user input to the computing system 102 to control the virtual avatar 110 via a game controller 128. For example, the user 100 may move a joystick on the game controller 128 to change a position of the virtual avatar 110 in the virtual environment. As another example, the user 100 may pull a trigger on the game controller 128 to shoot the virtual gun 112. The user 100 may provide any suitable user input via virtually any type of input device to control the virtual avatar 110 and/or other aspects of the virtual environment. In some implementations, the user 100 optionally may provide at least some user input via the computing system 102. For example, the computing system 102 may include one or more motion sensors that track a position/movement of the user's head, and the field of view 106 may change position within the virtual environment 108 based on movement (e.g., rotation, translation) of the user's head.

The user 100 may receive force feedback that simulates virtual forces in the virtual environment 108 via a plurality of haptic devices that are in communication with the computing system 102. In the depicted example, the user 100 is wearing a haptic vest 130 including a plurality of vibrating components arranged on the front, back, and sides of the user's torso. The user 100 is wearing haptic shoes 132 and 134. Each haptic shoe 132/134 includes a vibrating component in the sole of the shoe. The game controller 128 includes rumble motors in each hand-grip portion of the game controller. Head-mounted computing system 102 includes vibrating components positioned on each side of the user's head. As discussed in further detail below, these haptic devices may be controlled by computing system 102 to provide spatialized force feedback based on a dynamic mapping of haptic responses to haptic signals in the three-dimensional (3D) space of the virtual environment 108. Such haptic signals may be emitted from a variety of different haptic sources in the virtual environment 108.

Any suitable type of haptic device may be controlled by the computing system 102 to provide spatialized force feedback. Non-limiting examples of different types of haptic devices include devices having vibrating components, force feedback motors, solenoids, resistive/braking components, and/or air vortex rings/air pressure components. Some haptic devices may be held by the user. Some haptic devices may be worn by the user. Some haptic devices may be incorporated into furniture (e.g., a rumble chair, mixed-reality pinball machine). Some haptic devices may be incorporated into a real-world space (e.g., vibrating floor, walls).

Figure 2:
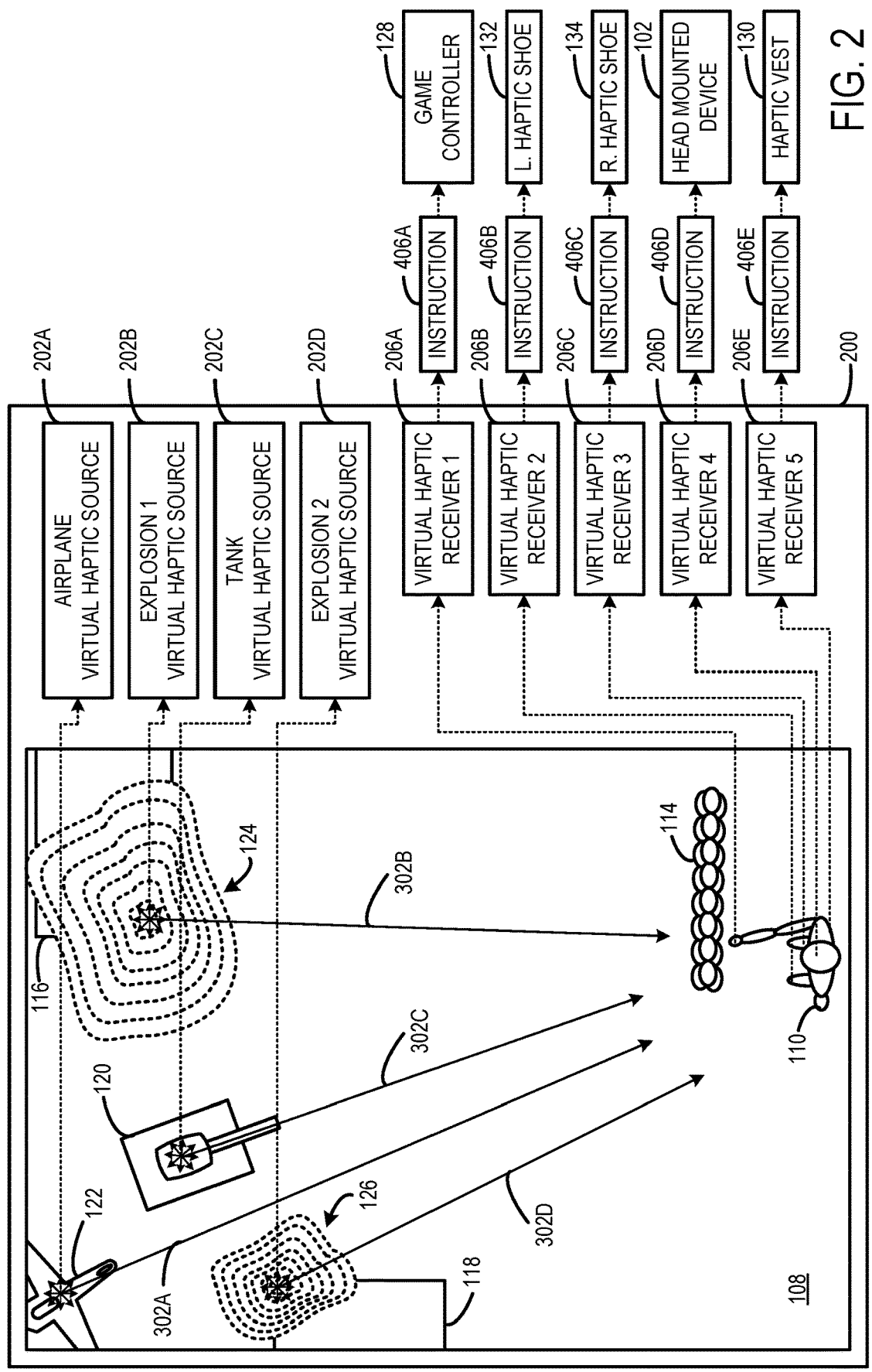
FIG. 2 shows an example scenario in which a game engine instantiates a plurality of virtual haptic sources and virtual haptic receivers for a virtual environment.

FIG. 2 schematically shows an example scenario in which a game engine 200 executable by the computing system 102 of FIG. 1 controls the plurality of haptic devices of FIG. 1 to provide spatialized force feedback that simulates virtual forces in the virtual environment 108. FIG. 2 includes an overhead representation of the portion of the virtual environment 108 visually presented in the field of view 106 of FIG. 1. Note that this overhead representation is provided for reference and is not to scale.

The game engine 200 may be configured to generate the virtual environment 108 including all of the different virtual objects and environmental features shown in the field of view 106 of FIG. 1. The game engine 200 may be configured to instantiate one or more virtual haptic sources 202 (e.g., 202A, 202B, 202C, 202D). A virtual haptic source 202 may represent a virtual object and/or event in the virtual environment 108 that emits a virtual force in the virtual environment 108. The virtual haptic source 202 is configured to encode such virtual forces as generic haptic signals that may be received and translated by all haptic receivers. The emission and transmission of haptic signals, as described herein, is virtual and may be implemented in any suitable way. As one example, a haptic source may be configured to pass the haptic signal as data to one or more data storage locations and/or downstream computing processes. In some implementations, a haptic receiver may be programmed to subscribe to each haptic source satisfying one or more criteria (e.g., in range, compatible haptics), and the virtual haptic source may be configured to pass the haptic signal to all subscribed haptic receivers.

Figure 3:
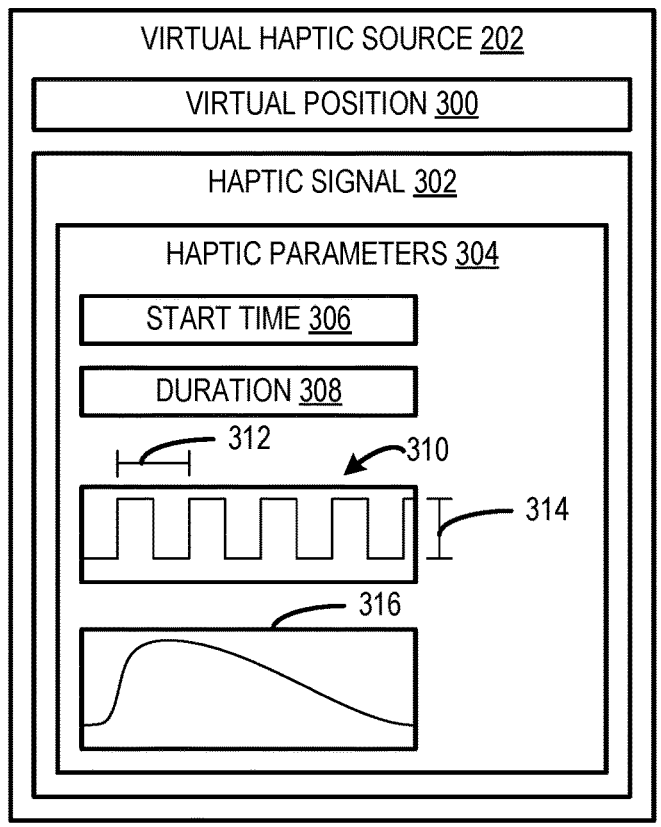
FIG. 3 schematically shows an example virtual haptic source.

FIG. 3 schematically shows a representation of an example virtual haptic source 202 that may be instantiated by the game engine 200. Virtual haptic source 202 includes a virtual position 300 of the virtual haptic source in the virtual environment 108. The virtual position 300 may take any suitable form. For example, the virtual position 300 may include a set of virtual coordinates in 3D space (e.g., x, y, z coordinates). In some examples, the virtual position 300 may include a pose in six degrees of freedom (6DOF).

The virtual haptic source 202 may be configured to virtually emit a haptic signal 302 that is defined by a set of haptic parameters 304. For example, the set of haptic parameters 304 may include a start time 306 at which the haptic signal 302 is emitted from the virtual haptic source 202. In the case where the virtual haptic source is an event (e.g., an explosion), the start time 306 may be a particular moment in time. In the case where the virtual haptic source continuously emits a haptic signal, the start time 306 may be listed as continuous. The set of haptic parameters 304 may include a duration 308 for which the haptic signal is emitted from the virtual haptic source 202. When the duration has expired the haptic signal may cease. Again, in the case where the virtual haptic source continuously emits a haptic signal, the duration 308 may be listed as continuous. The set of haptic parameters 304 may include a signal wave type 310. Non-limiting examples of different haptic signal wave types include square, sinusoidal, saw-tooth, and constant intensity. The set of haptic parameters 304 may include a frequency 312 and an amplitude 314 of the haptic signal 302. Note that these haptic parameters and thus the haptic signal may vary over time. The set of haptic parameters 304 may include a roll-off curve 316 of intensity over distance. For example, the roll-off curve may dictate that the amplitude of the haptic signal dampens at a specified rate as the haptic signal 302 travels away from the virtual haptic source. The roll-off curve 316 may dictate any suitable behavior of the haptic signal 302 as it travels through the virtual environment 108. The set of haptic parameters 304 are provided as an example, and the haptic signal 302 may be characterized by any suitable haptic parameter.

A virtual haptic source may emit a haptic signal in any suitable manner. In some examples, a virtual haptic source may emit a haptic signal continuously. In some examples, a virtual haptic source may emit a haptic signal periodically. In some examples, a haptic source may emit a haptic signal in response to an event or interaction that occurs in the virtual environment 108. In some cases, the haptic signal 302 may be omnidirectional. In some cases, the haptic signal may be unidirectional. In some cases, the haptic signal 302 may have a higher amplitude or intensity in a specific direction or range or directions. In general, the haptic parameters may be used to control these and other characteristics of the haptic signal.

In some implementations, virtual haptic sources and/or haptic signals may be associated with sound effects in the game code. In other words, the game engine 200 may be configured to analyze the sound effects in the game code to identify sound effects that have corresponding haptic effects and instantiate virtual haptic sources for the identified haptic effects.

Returning to FIG. 2, in the depicted example, the game engine 200 instantiates a plurality of virtual haptic sources 202 including a virtual haptic source 202A corresponding to the virtual airplane 122, a virtual haptic source 202B corresponding to the virtual explosion 124 of the virtual hangar 116, a virtual haptic source 202C corresponding to the virtual tank 120, and a virtual haptic source 202D corresponding to the virtual explosion of the virtual building 118. Each virtual haptic source 202 has a different virtual position 300 in the virtual environment 108 from which a haptic signal 302 originates and is emitted. The virtual haptic source 202A emits a haptic signal 302A that simulates the virtual forces produced by the virtual airplane 122, such as thrust and vibrations emitted from the engines and the propeller. The virtual haptic source 202B emits a haptic signal 302B that simulates the virtual forces produced by the virtual explosion 124, such as a concussive force. The virtual haptic source 202C emits a haptic signal 302C that simulates the virtual forces produced by the virtual tank 120, such as vibrations emitted from the engine and treads as well as concussive forces when the gun fires a shell. The virtual haptic source 202D emits a haptic signal 302D that simulates the virtual forces produced by the virtual explosion 126, such as a concussive force.

The game engine 200 may be configured to instantiate a virtual haptic receiver 206 (e.g., 206A, 206B, 206C, 206D, 202E) for each haptic device that is in communication with the computing system 102 and recognized by the game engine 200. Each virtual haptic receiver 206 may be configured to control spatial force feedback on the associated haptic device based on haptic signals 302 received from one or more of the virtual haptic sources 202 in the virtual environment 108. In one example, the game engine 200 may be programmed such that each different type of haptic device that can provide haptic feedback can be added through an interface or using a basic data structure in JSON or XML. In this way, the game engine may be extensible and new types of virtual haptic receivers can be added as new types of haptic devices are created and used to enhance interaction with the virtual environment 108. In some implementations, available haptic devices may be configured to register with a game engine, and the game engine may be configured to instantiate a virtual haptic receiver for each registered haptic device.

Figure 4:
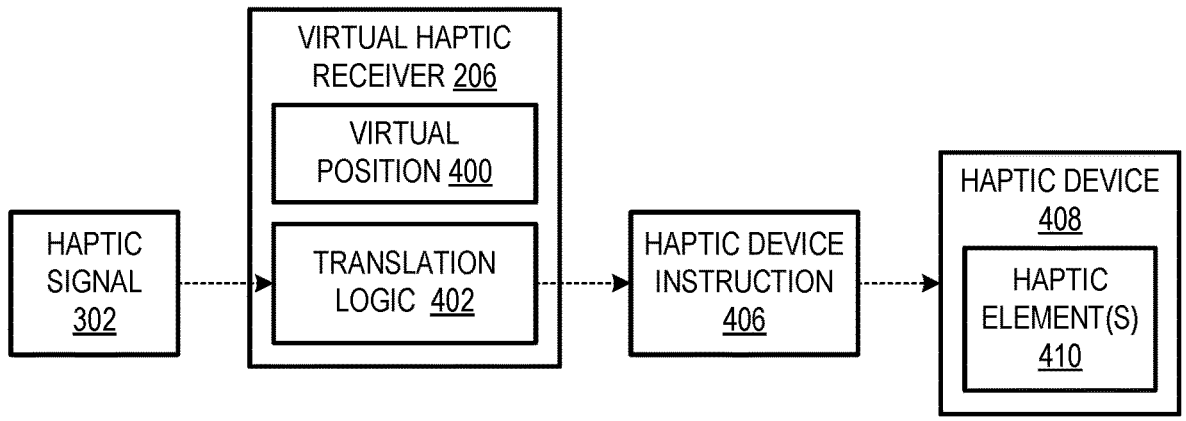
FIG. 4 schematically shows an example virtual haptic receiver.

FIG. 4 schematically shows a representation of an example virtual haptic receiver 206 that may be instantiated by the game engine 200 for a haptic device 408. The virtual haptic receiver 206 may have a virtual position 400 in the virtual environment 108. In some examples, the virtual position 400 of the virtual haptic receiver 206 may be arranged in relation to a virtual position (e.g., a center point (0, 0, 0)) of the virtual avatar 110 representing the user 100. Further, in some examples, the virtual positions 400 of the virtual haptic receivers 206 may be arranged such that the virtual positions are spatially registered to real-world positions of the haptic devices worn by the user 100. In some such examples, a real-world position of a haptic device may be tracked, and the corresponding virtual haptic receiver may move in the virtual environment 108 as the haptic device moves in the real world. For example, when the user holds a game controller with a right hand, the virtual haptic receiver may be positioned on the right side of the virtual avatar, and when the user holds the game controller with a left hand, the virtual haptic receiver may be positioned on the left side of the virtual avatar. In some implementations, the virtual position may be inferred based on the type of haptic device. For example, a virtual position of the virtual haptic receiver corresponding to a pair of virtual shoes may be inferred to be at the virtual feet of an avatar.

The virtual haptic receiver 206 may include translation logic 402 configured to translate a received haptic signal 302 into a haptic device instruction 406 useable to control force feedback on the haptic device 408. In some examples, the translation logic 402 may be configured to recognize the capabilities of the type of haptic device 408 and convert the received haptic signal 302 into a device-specific instruction 406 that is in a format recognizable by the haptic device 408.

In some examples, the haptic device 408 may include a single haptic element 410 (e.g., vibrator, force feedback motor, solenoid) that is controlled based on the haptic device instruction 406. In some examples, the haptic device 408 may include a plurality of haptic elements 410, and the haptic device instruction 406 may specify specific and/or different operation for each of the plurality of different haptic elements 410 based on a received haptic signal. For example, the game controller 128 may include a left-side, force-feedback motor and a right-side, force-feedback motor, and the haptic device instruction 406 for the game controller 128 may specify operating the left-side motor without operating the right-side motor based on the haptic signal 302 originating from the left side of the virtual avatar 110. In another example, the haptic device instruction 406 may specify operating the left-side motor with a greater intensity than the right-side motor based on the haptic signal 302 originating from the left of the virtual avatar 110. In another example, the haptic device instruction 406 may specify operating both motors in the same manner. In other implementations, each separate motor may have a different instantiated haptic receiver. In general, the translation logic 402 is programmed to tailor the haptic device instruction 406 to the force feedback capabilities of the particular type of haptic device 408. As such, the virtual haptic receiver serves as a universal translator for a wide variety of different haptic experiences that are generically encoded as compatible haptic signals. As such, any haptic device may be made fully compatible with all haptic signals by programming a haptic receiver that is configured to translate generic haptic signals into device-specific instructions.

In some implementations, the translation logic 402 may be configured to ignore haptic signals 302 that are incompatible with the haptic device 408. For example, a haptic device including a solenoid that is only capable of assuming an extended posture or a retracted posture (e.g., to simulate the recoil of a gun) may be unable to simulate certain types of haptic waves such as a sawtooth or sinusoidal wave. As such, the virtual haptic receiver instantiated for the haptic device including the solenoid may ignore such haptic signals.

Each instantiated virtual haptic receiver 206 may be configured to receive, from each virtual haptic source 202 in the virtual environment 108, a haptic signal 302 for the virtual haptic source 202. The virtual haptic receiver 206 may be configured to translate each received haptic signal 302 that is compatible with the haptic device 408 into a haptic device instruction 406 based on the translation logic 402.

In some examples, the virtual haptic receiver 206 may receive two or more haptics signals 302 simultaneously from two or more different virtual haptic sources 202. The virtual haptic receiver 206 may be configured to translate the two or more simultaneously received haptic signals from the two or more different haptic sources into one or more haptic device instructions 406. In some examples, the translation logic 402 may blend two or more simultaneously received haptic signals 302 into a haptic device instruction 406. For example, the instruction may encode a haptic response having an amplitude that is the sum of the amplitudes of the simultaneously received haptic signals. This scenario may occur as a result of two virtual explosions occurring simultaneously, for example. In another example, the translation logic may combine two different types of haptic signal waves (e.g., combine square and sawtooth waves). This scenario may result from a virtual machine gun being fired while riding on a moving virtual vehicle, for example. In some examples, the translation logic 402 may translate each haptic signal separately.

The virtual haptic receiver 206 may be configured to send, via a communication interface of the computing system 102, the haptic device instruction 406 to the haptic device 408, and the haptic device 408 may provide force feedback via the haptic elements 410 based on the haptic device instruction 406.

Returning to FIG. 2, in the depicted example, each of the virtual haptic receivers 206 receive haptic signals 302 from the plurality of virtual haptic sources 202. In some examples, the game engine 200 may be configured to adjust the haptic signals 302 conveyed to each virtual haptic receiver 206 differently based on at least the virtual position 300 of the virtual haptic source 202 and the virtual position 400 of the virtual haptic receiver 206. For example, adjusting the haptic signal 302 may include decaying the haptic signal 302 as a function of distance between the virtual haptic source 202 and the virtual haptic receiver 206. In the depicted scenario, the haptic signal 302D conveyed to the virtual haptic receiver 206B may have a greater intensity than the haptic signal 302D conveyed to the virtual haptic receiver 206C, because a distance between the virtual position of the virtual haptic receiver 206B and the virtual position of the virtual explosion 126 is shorter than a distance between the virtual position of the virtual haptic receiver 206C and the virtual position of the virtual explosion 126. In other words, the left haptic shoe 132 may vibrate with slightly greater intensity than the right haptic shoe 134, because the left haptic shoe 132 is closer to the virtual explosion 126.

In another example, adjusting the haptic signal 302 may include decreasing the haptic signal 302 as a function of a virtual object intermediate the virtual haptic source 202 and the virtual haptic receiver 206. In the depicted scenario, the haptic signal 302B conveyed to the virtual haptic receiver 206A may be decreased based on the virtual sandbag bunker 114, because the virtual sandbag bunker 114 is positioned intermediate the virtual explosion 124 and the virtual haptic receiver 206A. In other words, the user may feel less of the concussive force of the explosion, because the virtual avatar is hiding behind the sandbag bunker.

The game engine 200 may adjust a haptic signal based on intermediate virtual objects in any suitable manner. In one example, each virtual object in the virtual environment 108 may be assigned a particular haptic dampening value that may be used to adjust a haptic signal that intersects the virtual object. For example, virtual objects that are denser (e.g., metal, sand) may have higher dampening values and virtual objects that are less dense (e.g., wood) may have lower dampening values.

In some examples, the game engine 200 may be configured to adjust the haptic signals 302 conveyed to each virtual haptic receiver 206 differently based on at least the set of haptic parameters 304 that characterize the haptic signal 302. For example, a haptic signal's roll-off curve of intensity over distance may specify that virtual haptic receivers within a threshold distance before the signal intensity begins to roll-off may receive a haptic signal with greater intensity and virtual haptic receivers beyond the threshold distance may receive a haptic signal with lower intensity. Some virtual haptic receivers may be a far enough distance that the haptic signal has little or no haptic effect on the virtual haptic receiver. In the depicted scenario, the plurality of virtual haptic receivers 206 may be positioned close enough to the virtual explosion 124, the virtual tank 120, and the virtual explosion 126 to be within an effective region of the roll-off curves of the haptic signals 302B, 302C, and 302D. As such, the haptic signals 302B, 302C, and 302D may provide perceivable force feedback on the different haptic devices. On the other hand, the virtual haptic source 202A corresponding to the virtual airplane 122 may be far enough away from the plurality of virtual haptic receivers 206, such that the intensity of the haptic signal 302A decreases based on the roll-off curve to the point that the haptic signal 302A does not provide perceivable force feedback on the haptic devices.

In some examples, the game engine 200 may be configured to adjust the haptic signals 302 conveyed to each virtual haptic receiver 206 differently based on at least the virtual position 300 of the virtual haptic source 202, the virtual position 400 of the virtual haptic receiver 206, and the set of haptic parameters 304 that characterize the haptic signal 302.

In some examples, different virtual haptic receivers 206 may translate a received haptic signal 302 differently based on the different types of haptic devices associated with the different virtual haptic receivers. For example, the haptic signal 302D emitted from the virtual explosion 126 and received by the virtual haptic receiver 206B instantiated for the left haptic shoe 132 may be translated into an instruction to vibrate a vibration component of the left haptic shoe 132. Meanwhile, the virtual haptic receiver 206E instantiated for the haptic vest 130 may translate the haptic signal 302D into an instruction to turn force-feedback motors located on the front of the vest with higher intensity and turn force-feedback motors located on the back of the vest with a lower intensity. In this example, the haptic device instructions are specific to the type of haptic device. For example, if the haptic device instruction translated for the haptic shoe were sent to the haptic vest instead, then the haptic vest would not function as intended and may not function at all.

Figure 5:
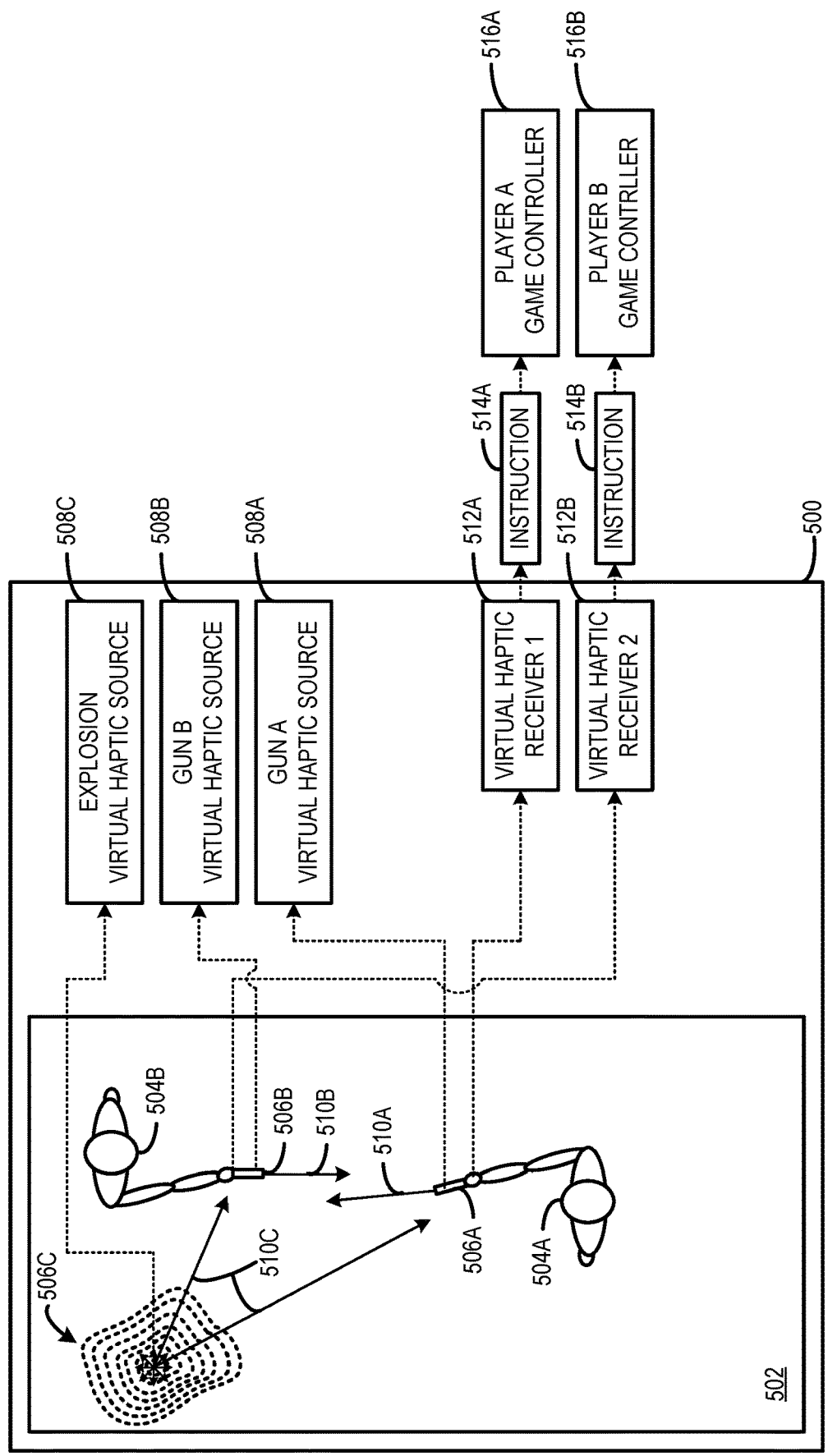
FIG. 5 schematically shows an example scenario in which a plurality of virtual haptic receivers are instantiated for a multi-user virtual environment.

FIG. 5 shows another example scenario in which different real-world users are playing a multiplayer video game in a shared virtual environment with haptic devices. A game engine 500 is configured to generate a virtual environment 502 including a first virtual avatar 504A that is holding a first virtual gun 506A. The virtual environment 502 further includes a second virtual avatar 504B holding a second virtual gun 506B. The virtual environment 502 additionally includes a virtual explosion 506C. The game engine 500 is configured to instantiate a plurality of virtual haptic sources 508. A virtual haptic source 508A corresponds to the first virtual gun 506A, a virtual haptic source 508B corresponds to the second virtual gun 506B, and a virtual haptic source 508C corresponds to the virtual explosion 506C. Each of the virtual haptic sources 508 has a virtual position in the virtual environment 502 and emit a haptic signal 510 characterized by a set of haptic parameters. The first virtual gun 506A emits a haptic signal 510A when the gun fires a bullet, the second virtual gun 506B emits a haptic signal 510B when the gun fires a bullet, and the virtual explosion 506C emits a haptic signal 510C.

The game engine 500 is configured to instantiate a plurality of virtual haptic receivers 512. A virtual haptic receiver 512A corresponds to a game controller 516A held by a first player, and virtual haptic receiver 512B corresponds to a game controller 516B held by a second player. Each virtual haptic receiver 512 has a different virtual position in the virtual environment 502. Each virtual haptic receiver 512 is configured to receive haptic signals 510 from the virtual haptic sources 508, translate the haptic signals 510 into haptic device instructions 514, and send the haptic device instructions 514 to the game controllers 516.

In the depicted scenario, the different players may receive different force feedback via the game controllers 516, based on the haptic signals 510 emitted from the different virtual haptic sources 508. For example, game controller 516A may provide less intense force feedback to the first player based on the virtual explosion 506C than force feedback provided by the game controller 516B to the second player, because the virtual haptic receiver 512B is closer to the virtual explosion 506C than the virtual haptic receiver 512A. In another example, the haptic signal 510A resulting from the virtual gun 506A firing the bullet may produce force feedback that is perceived by the first player. However, the second player may not receive any perceivable force feedback from the haptic signal 510A, because the virtual haptic receiver 512B may be far enough away from the virtual haptic source 508A that the roll-off curve of the haptic signal 510A decreases to an imperceptible level.

This multiplayer example may be extended to include any suitable number of different players using any suitable number of different haptic devices, because the game engine is configured to instantiate a different virtual haptic receiver for each haptic device.

Figure 6:
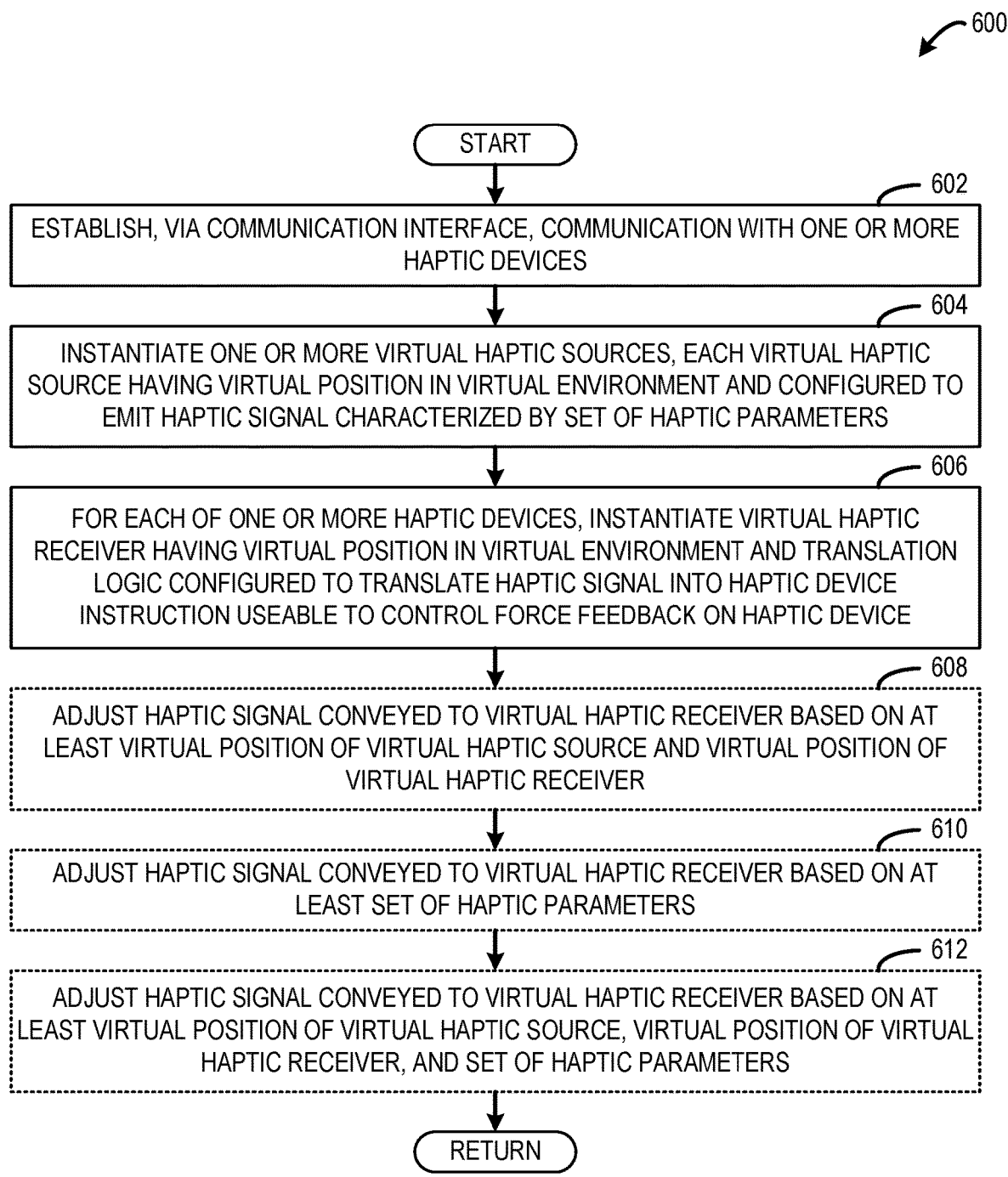
FIG. 6 shows an example method for controlling spatialized force feedback on one or more haptic devices.

FIG. 6 shows an example method 600 for controlling spatialized force feedback on one or more haptic devices. For example, the method 600 may be performed by the computing system 102 of FIG. 1, the computing system 800 of FIG. 8, and any other suitable computing system. At 602, the method 600 includes establishing, via a communication interface, communication with the one or more haptic devices. At 604, the method 600 includes instantiating one or more virtual haptic sources. Each virtual haptic source may have a virtual position in a virtual environment and may be configured to emit a haptic signal characterized by a set of haptic parameters. At 606, the method 600 includes for each of the one or more haptic devices, instantiating a virtual haptic receiver having a virtual position in the virtual environment and including translation logic configured to translate a received haptic signal into a haptic device instruction useable to control force feedback on the haptic device.

In some implementations, at 608, the method 600 optionally may include adjusting the haptic signal conveyed to the virtual haptic receiver based on at least the virtual position of the virtual haptic source and the virtual position of the virtual haptic receiver. For example, adjusting the haptic signal may include decaying the haptic signal as a function of distance between the virtual haptic source and the virtual haptic receiver. In another example, adjusting the haptic signal may include decreasing the haptic signal as a function of a virtual object intermediate the virtual haptic source and the virtual haptic receiver. In some implementations, at 610, the method 600 optionally may include adjusting the haptic signal conveyed to the virtual haptic receiver based on at least the set of haptic parameters. In some implementations, at 612, the method 600 optionally may include adjusting the haptic signal conveyed to the virtual haptic receiver based on at least the virtual position of the virtual haptic source, the virtual position of the virtual haptic receiver, and the set of haptic parameters.

Figure 7:
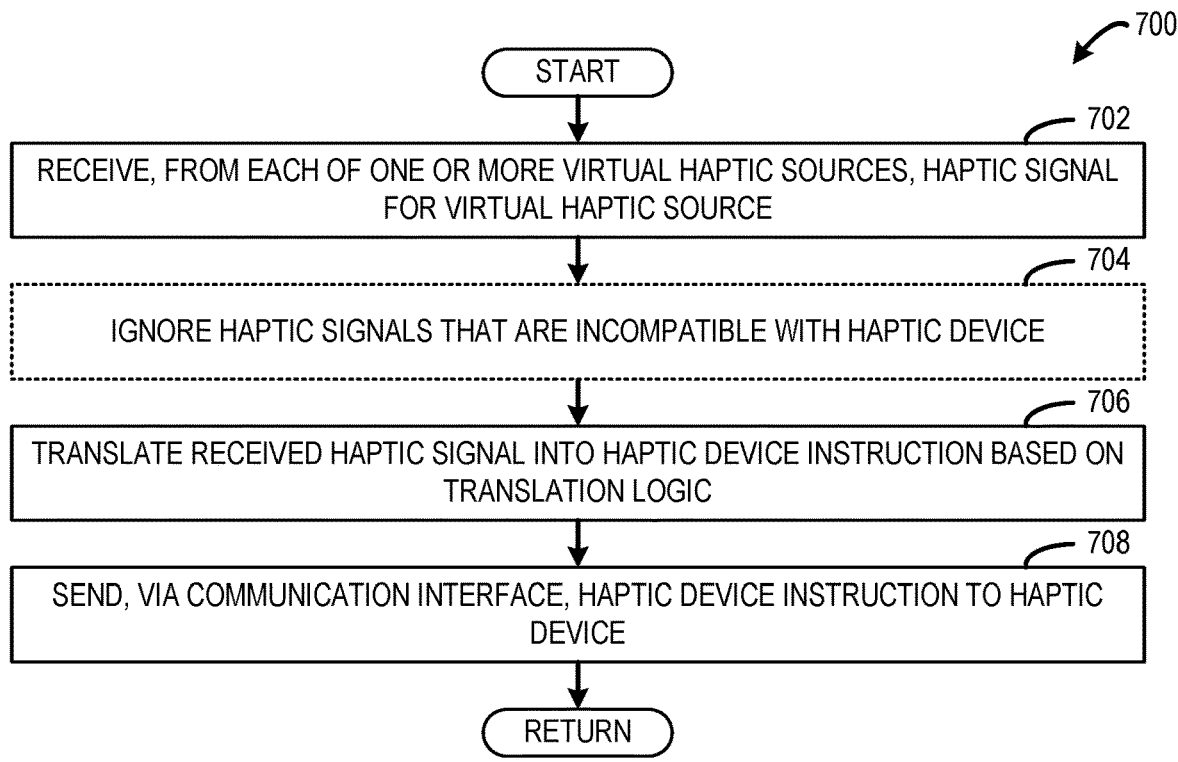
FIG. 7 shows an example method performed by a virtual haptic receiver to control a haptic device.

FIG. 7 shows an example haptic signal translation method 700 that may be performed by each instantiated virtual haptic receiver (e.g., virtual haptic receivers instantiated at step 606 of the method 600 of FIG. 6). At 702, the method 700 includes receiving, from each of one or more virtual haptic sources, the haptic signal for the virtual haptic source. In some implementations, at 704, the method 700 optionally may include ignoring haptic signals that are incompatible with the haptic device corresponding to the virtual haptic receiver. At 706, the method 700 includes translating the received haptic signal into a haptic device instruction based on the translation logic. At 708, the method 700 includes sending, via the communication interface, the haptic device instruction to the haptic device. In some examples, each virtual haptic receiver may perform the method 700 for each haptic signal received from each virtual haptic source.

In some implementations, the methods and processes described herein may be tied to a computing system of one or more computing devices. In particular, such methods and processes may be implemented as a computer-application program or service, an application-programming interface (API), a library, and/or other computer-program product.

Figure 8:
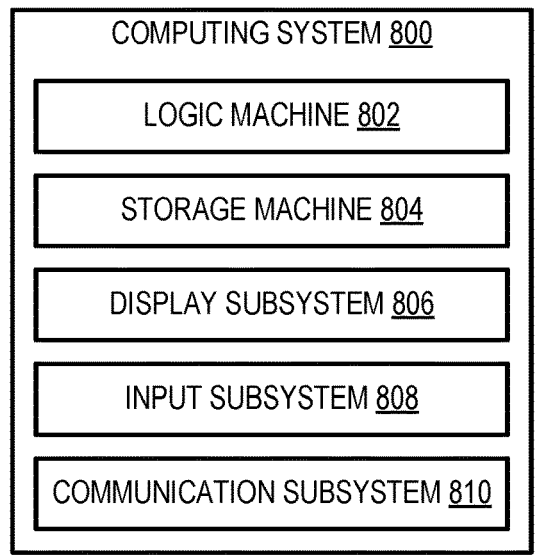
FIG. 8 shows an example computing system.

FIG. 8 schematically shows a non-limiting implementation of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), virtual-reality devices, augmented-reality devices, haptic devices and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine 802 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 802 may include one or more processors configured to execute software instructions. Additionally or alternatively, the logic machine 802 may include one or more hardware or firmware logic machines configured to execute hardware or firmware instructions. Processors of the logic machine 802 may be single-core or multi-core, and the instructions executed thereon may be configured for sequential, parallel, and/or distributed processing. Individual components of the logic machine 802 optionally may be distributed among two or more separate devices, which may be remotely located and/or configured for coordinated processing. Aspects of the logic machine 802 may be virtualized and executed by remotely accessible, networked computing devices configured in a cloud-computing configuration.

Storage machine 804 includes one or more physical devices configured to hold instructions executable by the logic machine 802 to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program," and "engine" may be used to describe an aspect of computing system 800 implemented to perform a particular function. In some cases, a program, or engine may be instantiated via logic machine 802 executing instructions held by storage machine 804. It will be understood that different programs, and/or engines may be instantiated from the same application, service, code block, object, library, routine, API, function, etc. Likewise, the same program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. Input subsystem 808 may comprise or interface with one or more haptic devices, such as a game controller, air vortex machine, haptic feedback helmet, haptic feedback vest, haptic feedback shoes, and other haptic feedback clothing. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Input subsystem 808 may comprise any suitable hardware componentry configured to establish communication with the one or more input devices. For example, input subsystem 808 may comprise wired or wireless (e.g., Bluetooth, Wi-Fi) communication channels configured to communicate with input devices and haptic devices. Input subsystem may be an example of a communication interface.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem 810 may be configured for communication via a wireless telephone network, or a wired or wireless local- or wide-area network. In some implementations, the communication subsystem 810 may allow computing system 800 to send and/or receive messages to and/or from other devices via a network such as the Internet.

In an example, a method for controlling spatialized force feedback on one or more haptic devices comprises establishing, via a communication interface, communication with the one or more haptic devices, instantiating one or more virtual haptic sources, each virtual haptic source having a virtual position in a virtual environment and configured to emit a haptic signal characterized by a set of haptic parameters, and for each of the one or more haptic devices, instantiating a virtual haptic receiver having a virtual position in the virtual environment and translation logic configured to translate a haptic signal into a haptic device instruction useable to control force feedback on the haptic device. The virtual haptic receiver is configured to receive, from each of one or more virtual haptic sources, the haptic signal for the virtual haptic source, translate the received haptic signal into a haptic device instruction based on the translation logic, and send, via the communication interface, the haptic device instruction to the haptic device. In this example and/or other examples, the method optionally may further comprise adjusting the haptic signal conveyed to the virtual haptic receiver based on at least the virtual position of the virtual haptic source and the virtual position of the virtual haptic receiver. In this example and/or other examples, adjusting the haptic signal optionally may include decaying the haptic signal as a function of distance between the virtual haptic source and the virtual haptic receiver. In this example and/or other examples, adjusting the haptic signal optionally may include decreasing the haptic signal as a function of a virtual object intermediate the virtual haptic source and the virtual haptic receiver. In this example and/or other examples, the method optionally may further comprise adjusting the haptic signal conveyed to the virtual haptic receiver based on at least the set of haptic parameters. In this example and/or other examples, the method optionally may further comprise adjusting the haptic signal conveyed to the virtual haptic receiver based on at least the virtual position of the virtual haptic source, the virtual position of the virtual haptic receiver, and the set of haptic parameters. In this example and/or other examples, the virtual haptic receiver optionally may be configured to translate two or more simultaneously received haptic signals from two or more different haptic sources. In this example and/or other examples, the translation logic optionally may be configured to ignore haptic signals that are incompatible with the haptic device. In this example and/or other examples, the set of parameters optionally may include at least a start time of the haptic signal. In this example and/or other examples, the set of parameters optionally may include at least a wave type of the haptic signal. In this example and/or other examples, the set of parameters optionally may include at least a frequency of the haptic signal. In this example and/or other examples, the set of parameters optionally may include at least an amplitude of the haptic signal. In this example and/or other examples, the set of parameters optionally may include at least a roll-off curve of intensity over distance of the haptic signal. In this example and/or other examples, the set of parameters optionally may include at least a duration of the haptic signal. In this example and/or other examples, the one or more haptic devices optionally may include a plurality of haptic devices used by a user, the user or a user avatar may have a virtual position in the virtual environment, and the virtual positions of the virtual haptic receivers instantiated for the plurality of haptic devices may be arranged in relation to the virtual position of the user or the user avatar. In this example and/or other examples, the plurality of haptic devices optionally may include a plurality of different types of haptic devices having different haptic feedback capabilities. In this example and/or other examples, the one or more haptic devices may include a plurality of haptic devices used by a plurality of different users. In this example and/or other examples, the haptic device instruction may be a device-specific instruction that is in a format recognizable by the haptic device.

In an example, a computing system comprises a communication interface configured to communicate with one or more haptic devices, a logic machine, and a storage machine holding instructions executable by the logic machine to instantiate one or more virtual haptic sources, each virtual haptic source having a virtual position in a virtual environment and configured to emit a haptic signal characterized by a set of haptic parameters, for each of the one or more haptic devices, instantiate a virtual haptic receiver having a virtual position in the virtual environment and translation logic configured to translate a haptic signal into a haptic device instruction useable to control force feedback on the haptic device. The virtual haptic receiver is configured to receive, from each of one or more virtual haptic sources, the haptic signal for the virtual haptic source, translate the received haptic signal into a haptic device instruction based on the translation logic, and send, via the communication interface, the haptic device instruction to the haptic device.

In an example, a method for controlling spatialized force feedback on one or more haptic devices comprises establishing, via a communication interface, communication with the one or more haptic devices, instantiating one or more virtual haptic sources, each virtual haptic source having a virtual position in a virtual environment and configured to emit a haptic signal characterized by a set of haptic parameters, and for each of the one or more haptic devices, instantiating a virtual haptic receiver having a virtual position in the virtual environment and translation logic configured to translate a haptic signal into a haptic device instruction useable to control force feedback on the haptic device. The virtual haptic receiver is configured to receive, from each of one or more virtual haptic sources, the haptic signal for the virtual haptic source, the received haptic signal being based on at least the virtual position of the virtual haptic source, the virtual position of the virtual haptic receiver, and the set of haptic parameters, translate the received haptic signal into a haptic device instruction based on the translation logic, and send, via the communication interface, the haptic device instruction to the haptic device.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for controlling spatialized force feedback on one or more haptic devices, the method comprising:
    establishing, via a communication interface, communication with the one or more haptic devices;
    instantiating one or more virtual haptic sources, each virtual haptic source having a virtual position in a virtual environment and configured to emit a haptic signal characterized by a set of haptic parameters; and
    for each of the one or more haptic devices, instantiating a virtual haptic receiver having a virtual position in the virtual environment and translation logic configured to translate the haptic signal into a haptic device instruction useable to control force feedback on the haptic device, the virtual haptic receiver being configured to:
        receive, from each of one or more virtual haptic sources, the haptic signal for the virtual haptic source, wherein the haptic signal decays as a distance between the virtual position of the virtual haptic source and the virtual position of the virtual haptic receiver increases;
        translate the received haptic signal into a haptic device instruction based on the translation logic; and
        send, via the communication interface, the haptic device instruction to the haptic device.

2. The method of claim 1, further comprising:
    adjusting the haptic signal conveyed to the virtual haptic receiver based on at least the virtual position of the virtual haptic source and the virtual position of the virtual haptic receiver.

3. The method of claim 2, wherein adjusting the haptic signal includes decreasing the haptic signal as a function of a virtual object intermediate the virtual haptic source and the virtual haptic receiver.

4. The method of claim 1, further comprising:
    adjusting the haptic signal conveyed to the virtual haptic receiver based on at least the set of haptic parameters.

5. The method of claim 1, further comprising:
    adjusting the haptic signal conveyed to the virtual haptic receiver based on at least the virtual position of the virtual haptic source, the virtual position of the virtual haptic receiver, and the set of haptic parameters.

6. The method of claim 1, wherein the virtual haptic receiver is configured to translate two or more simultaneously received haptic signals from two or more different haptic sources.

7. The method of claim 1, wherein the translation logic is configured to ignore haptic signals that are incompatible with the haptic device.

8. The method of claim 1, wherein the set of parameters includes at least a start time of the haptic signal.

9. The method of claim 1, wherein the set of parameters includes at least a wave type of the haptic signal.

10. The method of claim 1, wherein the set of parameters includes at least a frequency of the haptic signal.

11. The method of claim 1, wherein the set of parameters includes at least an amplitude of the haptic signal.

12. The method of claim 1, wherein the set of parameters includes at least a roll-off curve of intensity over distance of the haptic signal.

13. The method of claim 1, wherein the set of parameters includes at least a duration of the haptic signal.

14. The method of claim 1, wherein the one or more haptic devices includes a plurality of haptic devices used by a user, wherein the user or a user avatar has a virtual position in the virtual environment, and wherein the virtual positions of the virtual haptic receivers instantiated for the plurality of haptic devices are arranged in relation to the virtual position of the user or the user avatar.

15. The method of claim 14, wherein the plurality of haptic devices includes a plurality of different types of haptic devices having different haptic feedback capabilities.

16. The method of claim 1, wherein the one or more haptic devices includes a plurality of haptic devices used by a plurality of different users.

17. The method of claim 1, wherein the haptic device instruction is a device-specific instruction that is in a format recognizable by the haptic device.

18. A computing system comprising:
    a communication interface configured to communicate with one or more haptic devices;
    a logic machine; and
    a storage machine holding instructions executable by the logic machine to:
        instantiate one or more virtual haptic sources, each virtual haptic source having a virtual position in a virtual environment and configured to emit a haptic signal characterized by a set of haptic parameters;
        for each of the one or more haptic devices, instantiate a virtual haptic receiver having a virtual position in the virtual environment and translation logic configured to translate the haptic signal into a haptic device instruction useable to control force feedback on the haptic device, the virtual haptic receiver being configured to:
            receive, from each of one or more virtual haptic sources, the haptic signal for the virtual haptic source, wherein the haptic signal decays as a distance between the virtual position of the virtual haptic source and the virtual position of the virtual haptic receiver increases,
            translate the received haptic signal into a haptic device instruction based on the translation logic, and
            send, via the communication interface, the haptic device instruction to the haptic device.

19. A method for controlling spatialized force feedback on one or more haptic devices, the method comprising:
    establishing, via a communication interface, communication with the one or more haptic devices;
    instantiating one or more virtual haptic sources, each virtual haptic source having a virtual position in a virtual environment and configured to emit a haptic signal characterized by a set of haptic parameters; and
    for each of the one or more haptic devices, instantiating a virtual haptic receiver having a virtual position in the virtual environment and translation logic configured to translate the haptic signal into a haptic device instruction useable to control force feedback on the haptic device, the virtual haptic receiver being configured to:
        receive, from each of one or more virtual haptic sources, the haptic signal for the virtual haptic source, the received haptic signal being based on at least the virtual position of the virtual haptic source such that the haptic signal decays as a distance between the virtual position of the virtual haptic source and the virtual position of the virtual haptic receiver increases, the virtual position of the virtual haptic receiver, and the set of haptic parameters, translate the received haptic signal into a haptic device instruction based on the translation logic, and send, via the communication interface, the haptic device instruction to the haptic device.

\* \* \* \* \*